2,877,205

POLYMETHYL METHACRYLATE POLYMER IN ADMIXTURE WITH 2 BUTENE 1,4 DIOL DIMETHACRYLATE

Joginder Lal, Philadelphia, Pa., assignor to H. D. Justi & Son, Inc., Philadelphia, Pa., a corporation of Pennsylvania No Drawing. Application March 16, 1954
Serial No. 416,702

5 Claims. (Cl. 260—45.5)

This invention relates to a composition of matter comprising a methyl methacrylate polymer in admixture with dimethacrylate of 2-butene-1,4-diol.

Polymers of methyl methacrylate which may be used include compositions which are homopolymers prepared from methyl methacrylate monomers and a polymerization catalyst such as benzoyl peroxide, the monomer composition being cross-linked by the dimethacrylate of 2-butene-1,4-diol and also includes a copolymer of methyl methacrylate and ethyl methacrylate or butyl methacrylate. The polymer compositions and copolymer compositions are cross-linked by 2-butene-1,4-diol to provide improved toughness, abrasion resistance, thermal resistance and solvent resistance in the polymerized product.

The resinous material may also, if desired, contain an inert material such as diatomaceous earth, powdered glass, silicate, silica, alumina, pigments, etc. to introduce certain improvements in the mechanical properties of the final insoluble and infusible material.

My invention also relates to the polymeric products which are thus obtained and which are characterized by toughness, abrasion resistance, solvent resistance, etc. Resinous materials lack the degree of abrasion resistance of inorganic materials. While there has been achieved in recent years a considerable improvement in the hardness of organic materials, the hardness and abrasion resistance have been increased to such an extent as to make these materials brittle. For many applications, toughness and high resistance to abrasion are essential properties of the resinous materials.

Any suitable method may be employed in preparing the infusible and insoluble resins for use in my invention. For example, the monomers may be mixed together and made to undergo polymerization in the presence or absence of a suitable solvent, or a dispersing medium for the monomer, by the aid of heat, light or heat and light in the presence or absence of polymerization catalyst at subatmospheric, atmospheric or superatmospheric pressure. Instead of using monomeric materials, one may start with partially polymerized materials or with mixtures of monomeric and partially polymerized materials. Another way of obtaining the infusible and insoluble mass is to mix the mixture of monomers with polymer powder and to bring about the polymerization of the entire mass by the application of heat, light or heat and light in the presence or absence of polymerization catalyst at atmospheric, subatmospheric or superatmospheric pressure. The polymer powder used may be polymeric material from a single monomer, or a copolymer obtained from a mixture of monomers. It may or may not be a cross-linked copolymer. Mixtures of various polymers, copolymers may be similarly used. The polymer or copolymer may be obtained from polymerizable monomers such as the various esters of methacrylic acid. The polymer may also contain, if desired, an inert material such as diatomaceous earth, powdered glass, silicate, silica alumina, pigments, etc.

Suitable catalysts are the peroxides e. g. benzoyl peroxide, phthaloyl peroxide, napthoyl peroxide, substituted benzoyl peroxides, acetyl peroxide, caproyl peroxide, lauroyl peroxide, cinnamoyl peroxide, acetyl benzoyl peroxide, sodium peroxide, hydrogen peroxide, di-tert. butyl peroxide, tert. butyl hydroperoxide, tetralin peroxide, 1-hydroxycyclohexyl hydroperoxide-1, urea peroxide, etc., the per compounds, e. g., ammonium persulfate, sodium perchlorate, sodium perborate, potassium persulfate, etc., ozone, ozonides, etc., Lewis-acid type catalysts e. g., aluminum chloride, stannic chloride, etc., metal compounds of unsaturated acids such, for instance, as cobalt and manganese salts of linoleic acid, maleic acid, etc. Benzoyl peroxide is the preferred catalyst. The catalysts may be used alone or in admixture with one another. Any suitable amount of the catalyst or catalyst mixture may be used, but in general the catalyst concentration that gives satisfactory results may be within the range of 0.1 to 2.0 percent by weight of the entire polymerizable mass.

The action of the catalysts may be enhanced by the use of suitable promoters. A catalyst-promoter system can enable the polymerization to proceed at room temperature and bring about the polymerization of the entire mass in a much shorter time. A number of nitrogenous compounds e. g., amines especially aromatic and aliphatic tertiary amine, azo compounds, etc., aromatic sulfinic acids, certain sulfites like dibutyl sulfite, etc., long chain aliphatic mercaptans, e. g. dodecyl mercaptan, etc. are capable of promoting the action of catalysts like peroxides, per compounds like persulfates, etc. and bring about the polymerization at room temperature. The time required for such a polymerization will depend on the nature and amounts of the catalyst and promoter employed. In polymerizations of this type, it is generally desirable to employ polymer or copolymer powder along with the monomer mixture. Polymerization conditions may further be modified by the application of heat, light or heat and light, cooling, at atmospheric, subatmospheric and superatmospheric pressure.

The preparation of 2-butene-1,4-diol dimethacrylate as disclosed in my copending application Serial No. 416,701 incorporated herein by reference, said application now abandoned, is as follows (see Examples 18, 19 and 20 of my copending application):

To a mixture of 44 g. (0.5 mole) of 2-butene-1,4-diol and 40 g. (1 mole) of sodium hydroxide dissolved in 150 ml. of water was added dropwise 104.5 g. (1 mole) of methacrylyl chloride. The reaction mixture was stirred and the temperature was maintained at 0–5° C. by external cooling. At the end of the reaction, the organic phase was extracted with ether and washed with water. It was dried over anhydrous sodium sulfate. To the ether layer, about 2 g. of hydroquinone was added and after the removal of ether, the liquid was distilled under high vacuum to give 60 g. (53% of the theoretical yield), of 2-butene-1,4-dimethacrylate, B. P. 98–100° C./1.5 mm.

The following examples are merely illustrative of my invention:

*Example 1*

A mixture of 7 g. of ethyl methacrylate, 1 g. of styrene and 2 g. of 2-butene-1,4-dimethacrylate in which 0.1 g. of benzoyl peroxide had been dissolved was placed in a test tube which was flushed with nitrogen and which was then carefully sealed. The tube was suspended in hot water at 60° C. for 24 hours. On removal of the polymerized material from the tube, it was perfectly clear, had high abrasion resistance and failed to dissolve in acetone and benzene.

Similarly, samples were obtained for the various compositions as shown in the following examples:

Example 2

| | Grams |
|---|---|
| Ethyl methacrylate | 4 |
| Methyl methacrylate | 3 |
| 2-butene-1,4-dimethacrylate | 1.5 |

Example 3

| | |
|---|---|
| Methyl methacrylate | 4.5 |
| 2-butene-1,4-diacrylate | 0.5 |
| Polymethyl methacrylate powder | 5 |
| Benzoyl peroxide | 0.1 |

Example 4

| | |
|---|---|
| Butyl methacrylate | 1 |
| Methyl methacrylate | 3 |
| 2-butene-1,4-dimethacrylate | 2 |
| Polymethyl methacrylate | 3 |
| Alumina ground | 1 |
| Benzoyl peroxide | 0.1 |

A given mixture may be put into the desired mold which may be heated, if necessary, to bring about the polymerization. Pressure may or may not be applied. The following example is an illustration:

Example 5

| | |
|---|---|
| Methyl methacrylate | 8 |
| 2-butene-1,4-dimethacrylate | 2 |
| N,N-Dimethyl-p-toluidine | 0.05 |

The above liquid mixture may be mixed with 10 grams of polymethyl methacrylate powder to which 0.2 gram of benzoyl peroxide has been added. The resulting mass has a dough-like consistency and will undergo polymerization in air or even under water in about ten minutes.

The dough-like mass can be compressed in a suitable mold to any desired shape. Since the polymerization under these conditions is accompanied by the evolution of a large amount of heat, when larger masses of the material are being employed cooling of the mold may be found necessary.

A number of different types of promoters such as amines, azo compounds, aromatic sulfinic acids, certain sulfites, long chain aliphatic mercaptans, etc. may be used in conjunction with a suitable catalyst.

Although in the above examples I have used certain proportions of monomer, cross-linking agents and polymer or copolymer powder, etc., it should be clear that the proportions can be varied considerably with subsequent effect on the properties of the final material.

I claim:

1. A composition of matter comprising a polymethyl methacrylate in admixture with the dimethacrylate of 2 butene 1,4 diol.

2. A composition of matter comprising a polymethyl methacrylate in admixture with methyl methacrylate monomer and the dimethacrylate of 2 butene 1,4 diol.

3. A composition of matter comprising a copolymer of methyl methacrylate and another monomer selected from the group consisting of ethyl methacrylate and butyl methacrylate in admixture with the dimethacrylate of 2 butene 1,4 diol.

4. A composition of matter comprising a polymer of methyl methacrylate in admixture with methyl methacrylate monomer and the dimethacrylate of 2 butene 1,4 diol.

5. A composition of matter comprising methyl methacrylate monomer in admixture with the dimethacrylate of 2 butene 1,4 diol.

References Cited in the file of this patent

UNITED STATES PATENTS

| | | |
|---|---|---|
| 2,129,722 | Woodhouse | Sept. 13, 1938 |
| 2,189,734 | Kistler et al. | Feb. 6, 1940 |
| 2,468,094 | Marks | Apr. 26, 1949 |

FOREIGN PATENTS

| | | |
|---|---|---|
| 528,438 | Great Britain | Oct. 29, 1940 |

OTHER REFERENCES

Wiggins et al.: Jour. Chemical Society (London), pages 2371–2372 (1949).